United States Patent Office 3,490,829
Patented Jan. 20, 1970

3,490,829
APPARATUS FOR CONTACTLESS MARKING OF IMAGE POINTS IN PHOTOGRAMS
Otto Weibrecht, Jena, Germany, assignor to
VEB Carl Zeiss Jena, Jena, Germany
Continuation of application Ser. No. 469,964, May 27, 1965. This application Dec. 13, 1968, Ser. No. 785,860
Claims priority, application Germany, Aug. 14, 1964,
J 26,401
Int. Cl. G02b 27/22, 27/32, 21/18
U.S. Cl. 350—136
1 Claim

ABSTRACT OF THE DISCLOSURE

A photogrammetric apparatus for point transmission comprises a stereoscopic viewing and measuring system, carriers for the stereophotograms, an illumination system for illuminating the stereophotograms, and at least one radiation source emitting bundled optical rays. The optical rays near the stereophotograms are coaxial with the optical axes of the stereoscopic system. The system and the radiation source are displaceable relatively to the carriers for the purpose of identifying the points stereoscopically. The identified points are marked by means of the bundled optical rays.

---

Figure 1:
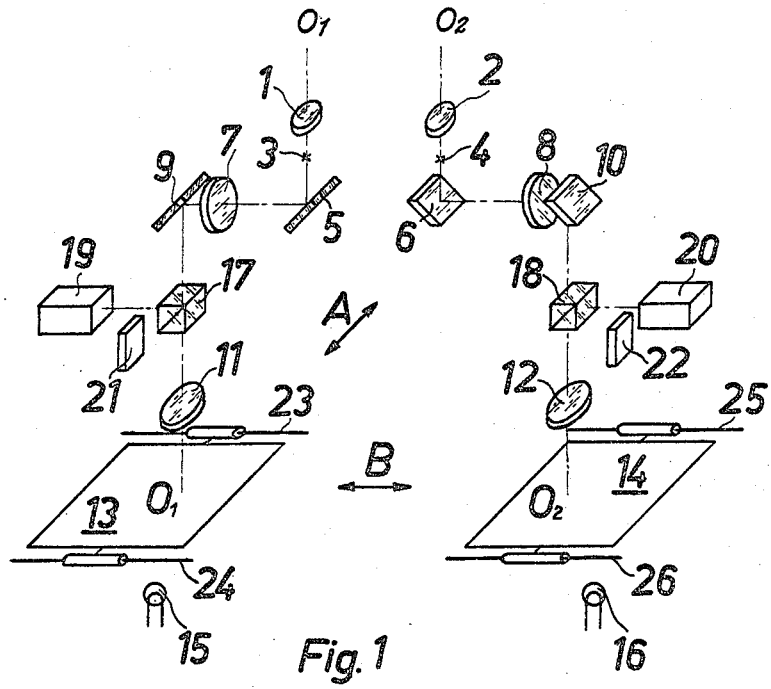

This invention relates to an apparatus for contactless marking of image points in photograms.

This is a continuation of applicant's application, Ser. No. 469,964, filed May 27, 1965, now abandoned.

Analytical methods in aerotriangulation reduce plotting to simple measurements of the image coordinates in the photograms. Such image-coordinate measuring can be carried out by means of stereocomparators or single-photogram comparators. Point identification is satisfactory in both cases, the accuracy of measurement being particularly great if the points to be plotted were signalled in the taking process in the landscape or are very accurately marked in the photograms. In some known stereoscopic point-transfer apparatus the points in one photogram can be transferred to and marked in the adjacent photogram, the image points being either those of a sequence of images of one flight strip or those of images of neighbouring flight strips.

These known point-transfer apparatus enable points in an areo-photogram to be mechanically marked in the photographic layer by means of a pricking pin, a stamp or a rotary engraving stylus, or by momentarily pressing into the layer a ball of very small diameter. The marking devices in use so far have the disadvantage that the points they produce are not exactly round and that residues of the excavation from the photographic layer partly remain in the crater and falsify the roundness of the point and partly deposit at the crater edge, where they gradually become bleary to the detriment of the quality of the point. Moreover, in the evaluation in the comparators, points marked in such a manner are satisfactorily visible only in transmitted light. Furthermore, since the marking device is subject to wear, the diameter of the points will not in the long run remain constant, the only remedy being a replacement of the marking device. The known marking devices are useless, however, when points are to be marked in film positives or negatives spread out for flattening between two glass plates.

The present invention aims at obviating the foregoing disadvantages and to this end consists in an apparatus for marking points in the photographic layer of positives or negatives of photograms in such correct and well-defined manner that these points are clearly visible in both incident and transmitted light.

Accordingly, the present invention consists in a contactless marking of image points in photograms, the optical rays in the plane of the photographic layer being bundled to a desired diameter and for a short time made to influence the photographic layer. The energy of the optical rays during the marking process must be so great as to remove at least the photographic layer to any desired extent and within any desired space of time. The method, which enables the marking of points to take place also in films spread out between two glass plates, is in general intended for stereoscopic point transfer for the marking of identified and transferred points. An apparatus particularly adapted for carrying the method into practice is connected to a photogram-viewing system and comprises a radiation source conjugate to the photogram and emitting a beam of parallel light rays, an optical element bundling the rays, and means for effecting relative motions of the optical element and the photogram parallel and at right angles to the plane of the photogram. The relative motions of optical element and the photogram parallel to the plane of the photogram are synchronous with the relative motions of the observation system and the photogram. It is of no account whether the photogram is displaced relatively to the observation system and the optical element, or vice versa, or whether both displacements are combined with each other. The radiation source of the apparatus can be displaceable together with all the other optical parts. Any change in the distance apart of optical element and photogram alters the focusing and, accordingly, the diameter of the point to be marked.

If the apparatus is used in connection with a stereoscopic viewing system, each photogram has conjugate to it a radiation source and an optical ray-bundling element. The apparatus can be simplified by the use of but one radiation source, causing the radiation emitted by this source to be directed to a geometric or physical beam splitter whence partial beams proceed to the photograms by way of a corresponding number of deviating elements which may differ from each other according to the respective ray paths.

The optical element can be a convergent lens, a mirror, or, if the energy of the used optical rays is great enough, a diaphragm.

The invention is not restricted to any definite kind of radiation source, the only requisite being sufficient radiation energy for the purpose in question.

The markings produced in the inventive process when being measured in comparators, are visible in equally good quality in transmitting as well as in incident light. Visibility in incident light is of particular importance if in the train of a further automatizaton of the measuring process the adjustment of the points is no longer subjective but objective, taking place for example by means of a photoelectronic measuring instrument. Illumination in incident light presents the advantage that the image content proper of the photogram becomes almost invisible, so that the produced point marks are all the more conspicuous and the measuring automatics are at the outset precluded from faulty decisions due to any resemblance which details in the photogram may bear to point markings.

The apparatus according to the invention for contactless marking of points in photograms by means of optical rays can be used in combination with a great variety of monocular or stereoscopic viewing systems and measuring apparatus.

Figure 2:
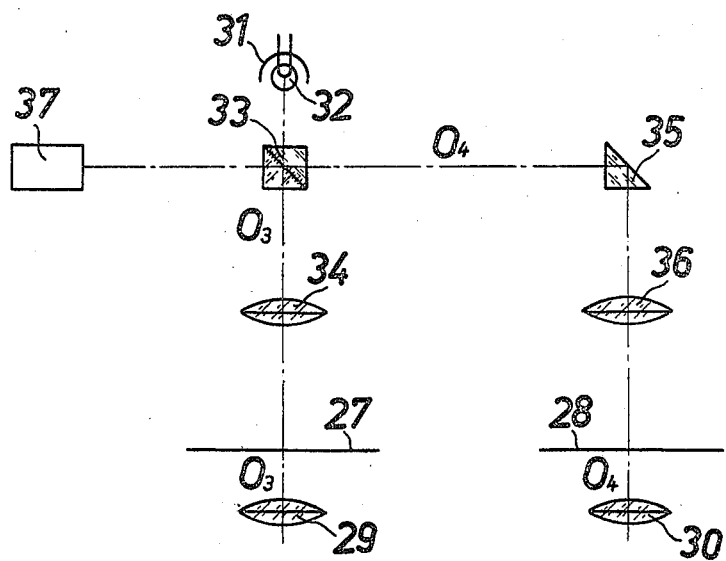

In order that the invention may be more readily understood reference is made to the accompanying drawing which illustrates diagrammatically and by way of example, in connection with stereoscopic viewing systems, two embodiments of an apparatus for contactless marking of image points in photograms, and wherein FIG. 1 shows the one embodiment in a perspective view, and FIG. 2 shows the other embodiment in side elevation.

In FIG. 1 of the drawing, optical axes $O_1-O_1$ and $O_2-O_2$ of two viewing systems contain respectively eyepieces 1 and 2, measuring marks 3 and 4 in the focal plane of the eyepieces, first deviating mirrors 5 and 6, intermediate lenses 7 and 8, second deviating mirrors 9 and 10, and objectives 11 and 12. The intermediate lenses 7 and 8 as well as the objectives 11 and 12 are axially displaceable for focusing. The focal plane of the objectives 11 and 12 contains respectively photograms 13 and 14 illuminated from below by lamps 15 and 16.

In the optical ray paths between mirror 5 and objective 11 and between mirror 6 and objective 12 are respectively located beam-splitting cubes 17 and 18 which unite the radiations from radiation sources 19 and 20 with the observation ray paths and direct the united rays through the objectives 11 and 12 to the photograms 13 and 14. As the radiation sources 19 and 20 emit parallel rays, the objectives 11 and 12 in the plane of the photograms produce focal spots which are variable in size. The radiation source 19 can be eclipsed by a shutter 21 in the parallel ray path between radiation source 19 and beam-splitting cube 17, and the radiation source 20 can be eclipsed by a shutter 22 in the parallel ray path between radiation source 20 and beam-splitting cube 18. In FIG. 1 both shutters assume open positions.

The stereoscopic viewing system by means not shown in the drawing is displaceable along the direction of an arrow A, and the photograms 13 and 14 are respectively displaceable in guides 23, 24 and 25, 26 along the direction of an arrow B.

The apparatus is used as follows: The stereoscopic viewing system and the photograms 13, 14 are displaced relatively to each other until one image point is focused it in both photograms. The closed shutters 21 and 22 are opened, so that the high energy of the bundled rays causes punctiform local evaporation in the photographic layers of the photograms 13 and 14. If the optical radiation energy is strong enough, the shutters 21 and 22 need be open only a fraction of a second.

Other than in FIG. 1, the stereoscopic viewing system in the embodiment FIG. 2 is on the one and the illumination system is on the other side of the photograms, but the photograms are assumed to be so arranged, as in FIG. 1, that relative motion can take place between the illumination and the viewing system on the one hand and the photograms on the other.

In FIG. 2, two photograms 27 and 28 lie in the focal plane of objectives 29 and 30 of a stereoscopic viewing system (not shown). The light beam emitted by a light source 32 having a reflector 31 is split by a cube 33. The one part of the beam traverses the cube 33 and an illumination objective 34 in straight direction. The other part of the beam is deflected by the cube 33 to the hypothenuse surface of a right-angled prism 35 and traverses an illumination objective 36. The objectives 29 and 30 lie on the one side and the illumination objectives 34 and 36 on the other side of the photograms 27 and 28. The light source 32, the splitting cube 33, the right-angled prism 35 and the two illumination objectives 34 and 36 serve the purpose of illuminating those sections of the photograms 27 and 28 which happen to be viewed through the stereoscopic viewing system. For focusing, the illumination objectives 34 and 36 are displaceable along their axes.

The apparatus also has a radiation source 37 which emits controllable radiation pulses of parallel light rays to be split by the cube 33. The one part of the emitted light traverses the illumination objective 34 and strikes the photogram 27, and the other part traverses the illumination objective 36 and strikes the photogram 28. The partial beam represented by its axis $O_3-O_3$ produces a hole in the photographic layer of the photogram 27, and the partial beam represented by its axis $O_4-O_4$ produces a hole in the photographic layer of the photogram 28, which means the marking of the defined image point.

What is claimed is:

1. A stereophotogrammetric apparatus for aligning and projecting points from one photogram to another in juxtaposition thereto and for marking these points, comprising a stereoscopic viewing system made up of two objectives and two respective eyepieces,
    each of said objectives and its conjugate eyepiece having a common optical axis,
a measuring mark located on each of said optical axes at the point of intersection of image plane and the optical axis,
    the optical axes at the points of intersection being substantially at right angles to the two photograms, said viewing system being adapted for viewing the photograms and by means of said measuring marks adjusting the points to be transmitted,
at least one source of light optically aligned with the two photograms for illuminating the same,
    the two photograms being respectively located in the focal planes of said objectives between said source of light and said objectives,
at least one radiation source optically aligned with said photograms and emitting a bundle of parallel optical rays of sufficient intensity for marking the points to be projected,
optical means located on said optical axis for directing the bundle of parallel rays to the photograms,
at least one optical element on said optical axis for limiting in the plane of the photograms the cross-sectional area of the bundle of parallel rays to the desired size of the marks,
    the bundle of parallel rays at least near said photograms being coaxial with the respective optical axis,
light-intercepting means on said optical axis and being displaceable substantially at right angles to the ray bundle emanating from said radiation source,
and means for adjusting each photogram relative to each ray bundle in accordance with the motions of the photograms relative to the optical axes.

References Cited

UNITED STATES PATENTS

| | | |
|---|---|---|
| 2,674,152 | 4/1954 | Wilkinson. |
| 3,096,767 | 7/1963 | Gresser et al. |
| 3,266,393 | 8/1966 | Chitayat. |
| 2,427,256 | 9/1957 | Butscher _____ 350—30 X |
| 2,649,834 | 8/1953 | Sweet. |
| 2,674,152 | 4/1954 | Wilkinson _____ 350—30 X |
| 2,835,165 | 5/1958 | Smith. |
| 2,960,006 | 11/1960 | Bartorelli _____ 350—30 X |
| 3,207,904 | 9/1965 | Heinz _____ 250—202 |
| 3,096,767 | 7/1963 | Gresser et al. |
| 3,265,855 | 8/1966 | Norton. |
| 3,169,183 | 2/1965 | Radtke et al. _____ 219—121 |
| 3,266,393 | 8/1966 | Chitayat. |
| 3,259,730 | 7/1966 | Wehde et al. _____ 331—54.5 |

FOREIGN PATENTS 642,492   2/1937   Germany.

DAVID SCHONBERG, Primary Examiner

PAUL R. GILLIAM, Assistant Examiner

U.S. Cl. X.R.

350— 10, 30, 133, 141